US007784580B2

(12) United States Patent
Takahata

(10) Patent No.: US 7,784,580 B2
(45) Date of Patent: Aug. 31, 2010

(54) FUEL SUPPLY SYSTEM COMPONENT PROTECTIVE CONSTRUCTION

(75) Inventor: Katsuhiko Takahata, Nagoya (JP)

(73) Assignees: Toyota Jidosha Kabushiki Kaisha, Aichi (JP); Kabushiki Kaisha Toyoda Jidoshokki Seisakusho, Aichi-ken (JP)

( * ) Notice: Subject to any disclaimer, the term of this patent is extended or adjusted under 35 U.S.C. 154(b) by 287 days.

(21) Appl. No.: 12/063,892

(22) PCT Filed: Nov. 17, 2005

(86) PCT No.: PCT/IB2006/003952

§ 371 (c)(1), (2), (4) Date: Feb. 15, 2008

(87) PCT Pub. No.: WO2007/057784

PCT Pub. Date: May 24, 2007

(65) Prior Publication Data

US 2008/0217089 A1 Sep. 11, 2008

(30) Foreign Application Priority Data

Nov. 18, 2005 (JP) ............................ 2005-334374

(51) Int. Cl.
*B60K 28/10* (2006.01)

(52) U.S. Cl. ...................................................... 180/274

(58) Field of Classification Search ............. 123/195 C, 123/198 C, 198 D, 198 E, 468–470, 509; 180/274; 210/232, 416.4
See application file for complete search history.

(56) References Cited

U.S. PATENT DOCUMENTS 7,392,782 B2 * 7/2008 Fujii ..................... 123/198 D

FOREIGN PATENT DOCUMENTS

| | | | |
|---|---|---|---|
| EP | 1 447 553 | A2 | 8/2004 |
| GB | 2 333 810 | A | 8/1999 |
| JP | 62-169234 | U | 10/1987 |
| JP | 02-145635 | U | 12/1990 |
| JP | 6-280710 | A | 10/1994 |
| JP | 08-127254 | A | 5/1996 |
| JP | 11-141433 | A | 5/1999 |
| JP | 11210488 | A * | 8/1999 |
| JP | 2001-317436 | A | 11/2001 |
| JP | 2003-120467 | A | 4/2003 |
| JP | 2004-245147 | A | 9/2004 |
| JP | 2004-360581 | A | 12/2004 |

* cited by examiner

*Primary Examiner*—Paul N Dickson
*Assistant Examiner*—Robert A Coker
(74) *Attorney, Agent, or Firm*—Sughrue Mion, PLLC

(57) ABSTRACT

A fuel supply system component protective construction includes a high-pressure fuel pump (21), a protector (41), and a pin member (51). The high-pressure fuel pump (21) includes a block (31) and a union (23). The block (31) is endowed with a relatively high rigidity with respect to the union (23). The protector (41) confronts the union (23) and the block (31) at a certain distance. The pin member (51) is provided between the block (31) and the protector (41). When the high-pressure fuel pump (21) and the protector (41) shift in the direction to mutually approach one another, the pin member (51) contacts the block (31) before the protector (41) contacts the union (23), so that a resilient force operates upon the high-pressure fuel pump (21) and the protector (41).

16 Claims, 9 Drawing Sheets

FUEL SUPPLY SYSTEM COMPONENT PROTECTIVE CONSTRUCTION

BACKGROUND OF THE INVENTION

1. Field of the Invention

The present invention relates to a fuel supply system component protective construction, and, more specifically, relates to a protective construction for a fuel supply component, which is contained within an engine compartment at the front of a vehicle.

2. Description of the Related Art

In relation to a fuel supply system component protective construction, there is disclosed, for example in Japanese Patent Application Publication No. JP-A-6-280710 (JP-A-6-280710), a fuel system member fitting construction which prevents a fuel system member such as a fuel filter or the like provided within an engine compartment from being damaged during a collision. In this technology described in JP-A-6-280710, a fuel filter and a battery within an engine compartment are arranged with a certain gap between them. A protector is provided to the fuel filter, and surrounds the fuel filter. A wedge shaped projection is formed upon the protector, which projects towards the battery.

In the technology described in JP-A-6-280710, if during a vehicle collision the battery is pushed backward towards the fuel filter, the rear wall portion of the battery is destroyed by the wedge shaped projection, so that the shock upon the fuel filter is mitigated. However, sometimes the battery continues to shift towards the fuel filter even after it has collided with the protector, depending upon the magnitude of the shock which is generated during the collision. In this case, it is difficult to protect the fuel filter in an appropriate manner, since there is a possibility that the protector which has pressed upon the battery may damage the fuel filter.

SUMMARY OF THE INVENTION

Thus, the object of this invention is to provide a fuel supply system component protective construction, with which appropriate protection of a fuel supply system component during a vehicle collision or the like may be anticipated.

A first aspect of the invention relates to a fuel supply system component protective construction includes a fuel supply system component, a protective member, and a shock absorption member. The fuel supply system component is disposed between a vehicle structural component mounted upon a vehicle, and a vehicle main body component which makes up a vehicle body of the vehicle. The fuel supply system component has a high rigidity portion and a low rigidity portion. The high rigidity portion is endowed with a relatively high rigidity as compared with the low rigidity portion. The fuel supply system component is supported upon the vehicle structural component. The protective member is disposed between the fuel supply system component and the vehicle main body component, and confronts the high rigidity portion and the low rigidity portion at a certain distance. The shock absorption member is provided between the high rigidity portion and the protective member. When the fuel supply system component and the protective member shift in the direction to mutually approach one another, the shock absorption member contacts the high rigidity portion before the protective member contacts the low rigidity portion, so that a resilient force is caused to operate upon the fuel supply system component and the protective member.

According to this fuel supply system component protective construction of the first aspect of the invention as described above, if during a vehicle collision or the like the fuel supply system component and the protective member shift in the direction to mutually approach one another, due to the fact that, first, the shock absorption member comes into contact with the high rigidity portion of the fuel supply system component, accordingly the energy by which the fuel supply system component and the protective member approach one another is reduced. Because of this, it is possible either to prevent the protective member from coming into contact with the low rigidity portion of the fuel supply system component, or, even if they do come into mutual contact, to keep the shock which is imparted to the low rigidity portion small. As a result, it is possible to anticipate that the fuel supply system component will be protected in an appropriate manner.

In the above described first aspect of the invention, it would also be acceptable for the high rigidity portion to be made of cast iron. According to the fuel supply system component protective construction structured in this manner, since cast iron has high rigidity, it is possible more effectively to reduce the energy with which the fuel supply component and the protective member mutually approach one another. Furthermore, it would also be acceptable for the low rigidity portion to be made of steel.

In the above described aspect of the invention, it would also be acceptable for the shock absorption member to be provided to the protective member, and to project towards the high rigidity portion. According to the fuel supply system component protective construction which is structured in this manner, it is possible to anticipate that the fuel supply system will be protected in an appropriate manner with a simple structure.

In the above described aspect of the invention, it would also be acceptable for the shock absorption member to be supported by a support member which is fixed to the vehicle structural component.

Furthermore, in the above described aspect of the invention, it would also be acceptable for the protective member to be supported by the vehicle structural component. Moreover, it would also be acceptable for the shock absorption member to be provided with a predetermined interval being left between it and the high rigidity portion. And it would also be acceptable for the predetermined interval to be smaller than the minimum gap between the low rigidity portion and the protective member.

According to the fuel supply system component protective construction which is structured in this manner, the protective member to which the shock absorption member is provided and also the fuel supply system component are both supported upon the vehicle structural component. In this case, during assembly of the protective member and the fuel supply system component, it becomes difficult to obtain good accuracy in the positional relationship between the high rigidity portion and the shock absorption member. However, with the invention, since the shock absorption member and the high rigidity portion are provided with the predetermined gap between them, accordingly it is possible to enhance the workability during assembly of the protective member and the fuel supply system component. Moreover, since this predetermined gap is set to be smaller than the minimum gap between the low rigidity portion and the protective member, accordingly it is possible for the shock absorption member to come into contact with the high rigidity portion, before the protective member comes into contact with the low rigidity portion.

Furthermore, in the above described aspect of the invention, it would also be acceptable for the shock absorption member to have an end surface which faces the high rigidity portion, and for the end surface to have a shape which engages with the confronting high rigidity portion. According to the fuel supply system component protective construction which is structured in this manner, it is possible to increase the contact area between the shock absorption member and the high rigidity portion, so that it is possible to reduce the energy by which the fuel supply system component and the protective member approach one another in an effective manner.

In the above described aspect of the invention, it would also be acceptable further to provide a second shock absorption member between the fuel supply system component and the protective member.

In the above described aspect of the invention, it would also be acceptable for the second shock absorption member to be provided to the protective member, and for the gap between the second shock absorption member and the fuel supply system component to be smaller than the minimum gap between the low rigidity portion and the protective member.

Furthermore, in the above described aspect of the invention, it would also be acceptable for the protective member to be supported by the vehicle structural component. According to the fuel supply system component protective construction which is structured in this manner, the protective member and the fuel supply system component are both supported by the vehicle structural component. Due to this, even if during a vehicle collision or the like the vehicle structural component shifts, nevertheless it is still possible to maintain the positional relationship between the protective member and the fuel supply system component. In this manner, it is possible to ensure more reliably that the shock absorption member comes into contact with the high rigidity portion, before the protective member comes into contact with the low rigidity portion.

Yet further, in the above described aspect of the invention, it would also be acceptable to further include a strut member which extends from the vehicle structural component towards the protective member, and which maintains the protective member in a position which is separated by a certain distance from the high rigidity portion and the low rigidity portion.

Screw portions may be formed upon the strut member for engaging to the vehicle structural component and to the protective member. According to the fuel supply system component protective construction which is structured in this manner, if during a vehicle collision or the like the fuel supply system component and the protective member shift in the direction to mutually approach one another, it is possible to reduce the energy by which the fuel supply system component and the protective member mutually approach towards one another with the strut member as well. Furthermore, since the screw portions are formed upon this strut member, accordingly it is possible to protect of the fuel supply system component with a simple structure.

Moreover, the fuel supply system component may be contained in an engine compartment which is provided at the front of the vehicle. According to the fuel supply system component protective construction which is structured in this manner, it is possible to contemplate that the fuel supply system component will be protected by the invention in an appropriate manner, since the possibility that the engine compartment will be deformed during a vehicle collision is great.

Furthermore, in the above described aspect of the invention, it would also be acceptable for the low rigidity portion to be a union. Still further, it would also be acceptable for the high rigidity portion to be a block.

As has been explained above, according to the invention, there is provided a fuel supply system component protective construction with which a fuel supply system component is appropriately protected during a vehicle collision or the like.

BRIEF DESCRIPTION OF THE DRAWINGS

The foregoing and/or further objects, features and advantages of the invention will become more apparent from the following description of example embodiments with reference to the accompanying drawings, in which the same or corresponding portions are denoted by the same reference numerals and wherein.

DETAILED DESCRIPTION OF THE EXAMPLE EMBODIMENTS

Figure 1:
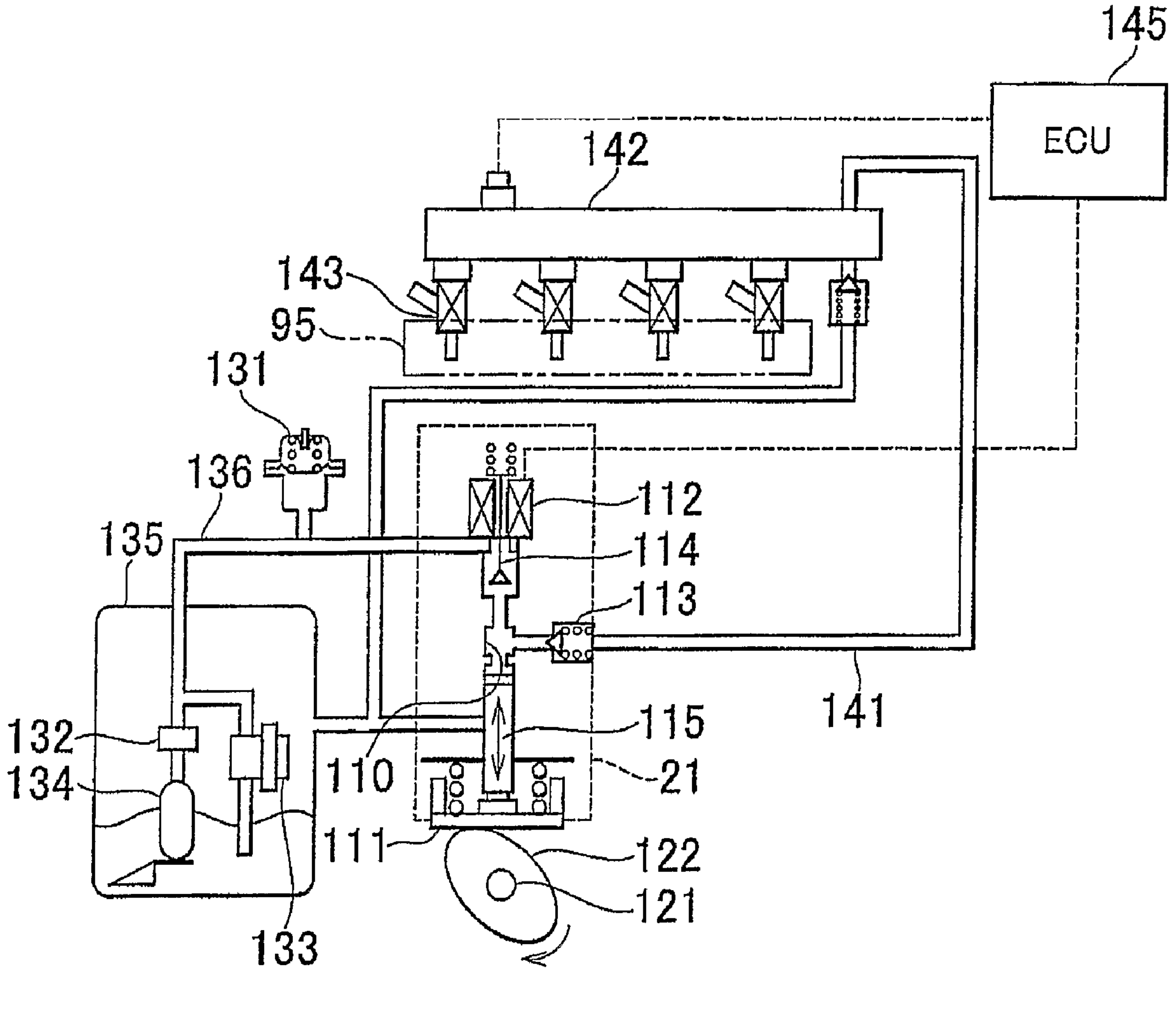
FIG. 1 is a structural diagram showing a fuel supply system which is provided to a vehicle.

Embodiments of this invention will now be explained with reference to the drawings. It should be understood that, in the drawings below, to the same or corresponding members, the same reference numerals are affixed.

I. Embodiment 1

FIG. 1 is a structural diagram showing a fuel supply system which is mounted to a vehicle. Referring to FIG. 1, this vehicle includes an engine 95 of a direct fuel injection into cylinder type, in which fuel which has been pressurized to a high pressure is directly injected into the fuel chambers of the cylinders. This fuel supply system includes a fuel tank 135, a high-pressure fuel pump 21, an accumulator pipe 142 (a delivery pipe or common rail or the like), injectors 143, or the like.

The high-pressure fuel pump 21 is connected to the fuel tank 135 and to the accumulator pipe 142 by a low-pressure fuel passage 136 and a high-pressure fuel passage 141, respectively. A pulsation damper 131 is provided upon the low-pressure fuel passage 136, with the aim of reducing fuel pulsation. A low-pressure fuel pump 134, a fuel filter 132, and a pressure regulator 133 are provided within the fuel tank 135.

The high-pressure fuel pump 21 fulfils the role of pressurizing the fuel to a high pressure and delivering it into the accumulator pipe 142. This high-pressure fuel pump 21 includes an electromagnetic spill valve 114, a plunger 115, a lifter 111, and a check valve 113. The electromagnetic spill valve 114 is provided at the position where the low-pressure fuel passage 136 leads to the high-pressure fuel pump 21. This electromagnetic spill valve 114 is a normally open type electromagnetic valve which includes a solenoid coil 112, and is controlled to be in the valve closed state or the valve opened state, based upon the presence or absence of current flowing through its solenoid coil 112. The opening and closing control of the electromagnetic spill valve 114 is performed by an ECU (electrical control unit) 145 which controls the operation of the engine 95 as a whole.

The lifter 111 is provide so as to contact against a cam 122 which is formed upon a camshaft 121. The plunger 115 is connected to the lifter 111. With this type of structure, when the camshaft 121 rotates, the plunger 115 is operated to reciprocate by the lifter 111, which receives the rotational drive of the cam 122.

The low-pressure fuel pump 134 is electrically driven along with the starting of the engine 95, and transfers fuel in the fuel tank 135 via the low-pressure fuel passage 136 to the high-pressure fuel pump 21. At this time, any impurities which are mixed into the fuel are removed by the fuel filter 132. Furthermore, the fuel pressure within the low-pressure fuel passage 136 is maintained by the pressure regulator 133 at a constant value which is set in advance. In other words, if the fuel pressure within the low-pressure fuel passage 136 is greater than or equal to this constant value, fuel is returned from the low-pressure fuel passage 136 to the fuel tank 135 via the pressure regulator 133.

The fuel which has passed through the low-pressure fuel passage 136 is introduced via the electromagnetic spill valve 114 into a pressurization chamber 110 of the high-pressure fuel pump 21. During the suction stroke of the high-pressure fuel pump 21, the plunger 115 moves downward along with the rotation of the camshaft 121, and the fuel within the low-pressure fuel passage 136 is taken into the pressurization chamber 110. And, during the delivery stroke of the high-pressure fuel pump 21, the plunger 115 is raised along with the rotation of the camshaft 121, and the fuel within the pressurization chamber 110 is delivered under pressure into the high-pressure fuel passage 141 and the accumulator pipe 142.

However, the deliver under pressure into the high-pressure fuel passage 141 and the accumulator pipe 142 only takes place during the delivery stroke if the electromagnetic spill valve 114 is in its valve closed interval, and if, even during the delivery stroke, the electromagnetic spill valve 114 is in its valve opened interval, then the fuel within the pressurization chamber 110 returns back into the low-pressure fuel passage 136. Due to this, it is possible to control the amount of fuel which is delivered under pressure into the high-pressure fuel passage 141 by controlling the valve closed interval of the electromagnetic spill valve 114 during the delivery stroke.

The check valve 113 only permits fuel to flow from the pressurization chamber 110 towards the accumulator pipe 142, while restraining the reverse flow of fuel from the accumulator pipe 142 to the pressurization chamber 110. Along with the accumulator pipe 142 maintaining the high-pressure state of the fuel, it also distributes this fuel to the injectors 143 which are provided to the various cylinders of the engine 95. Predetermined amounts of fuel are injected into the combustion chambers of the cylinders from these injectors 143.

Figure 2:
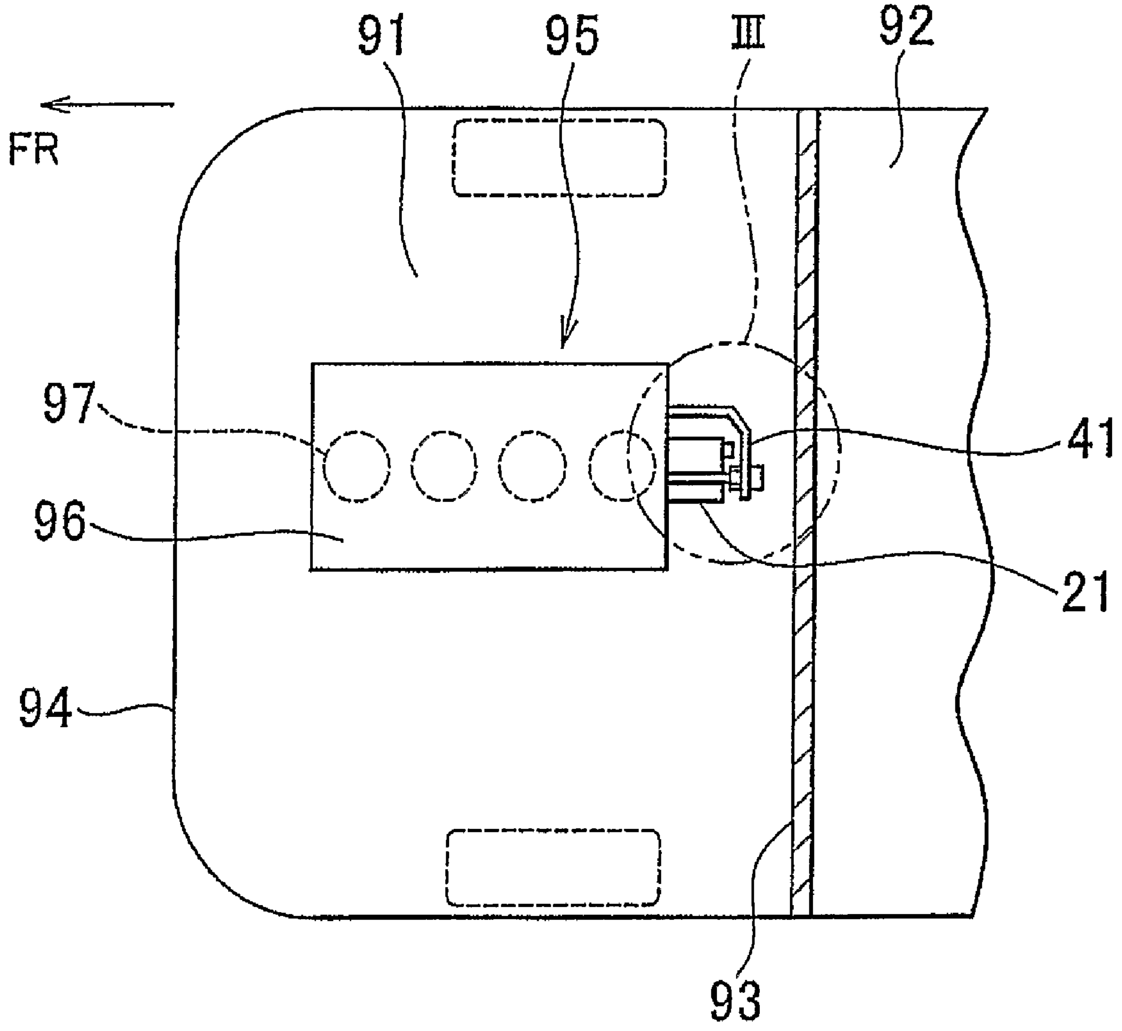
FIG. 2 is a plan view showing the interior of the engine compartment of the vehicle to which the fuel supply system component protective construction according to a first embodiment of this invention is applied.

FIG. 2 is a plan view showing the interior of the engine compartment of the vehicle to which a fuel supply system component protective construction according to a first embodiment of this invention is applied. Referring to FIG. 2, an engine compartment 91 is provided in the front of the vehicle. This engine compartment 91 is provided between a front bumper 94 and a dashboard panel 93. The dashboard panel 93 demarcates between the engine compartment 91 and the vehicle passenger compartment.

The engine 95 is arranged longitudinally within the engine compartment 91, so that its plurality of cylinders 97 are lined up in the fore and aft direction of the vehicle. This engine 95 is set up at a position which is separated by a certain distance towards the front of the vehicle from the dashboard panel 93. And the engine 95 includes a cylinder head 96 which, along with constituting the top portions of the combustion chambers, is also formed with intake ports and exhaust ports which communicate with the combustion chambers.

The high-pressure fuel pump 21 is fixed to the cylinder head 96 of the engine 95. This high-pressure fuel pump 21 is located between the engine 95 and the dashboard panel 93. Furthermore, a protector 41 is fixed to the cylinder head 96. This protector 41 is located between the high-pressure fuel pump 21 and the dashboard panel 93, and protects the high-pressure fuel pump 21. And the protector 41 is provided so as to be separated by predetermined gaps in the fore and aft direction of the vehicle from both the high-pressure fuel pump 21 and also the dashboard 93. The engine 95, the high-pressure fuel pump 21, the protector 41, and the dashboard panel 93 are arranged so as to be lined up in that order from the front of the vehicle towards the rear of the vehicle. Moreover, the engine 95, the high-pressure fuel pump 21, the protector 41, and the dashboard panel 93 are arranged so as to be lined up in that order in the horizontal direction and moreover unidirectionally.

In this embodiment, the high-pressure fuel pump 21 and the protector 41 are fixed to the same component within the engine compartment 91. In this embodiment, the engine 21 corresponds to this same component. However, the high-pressure fuel pump 21 and the protector 41 are not limited by this; they could also be fixed to separate components within the engine compartment 91. The protector 41 may be fixed to the high-pressure fuel pump 21, or may also be fixed to the dashboard panel 93.

Figure 3:
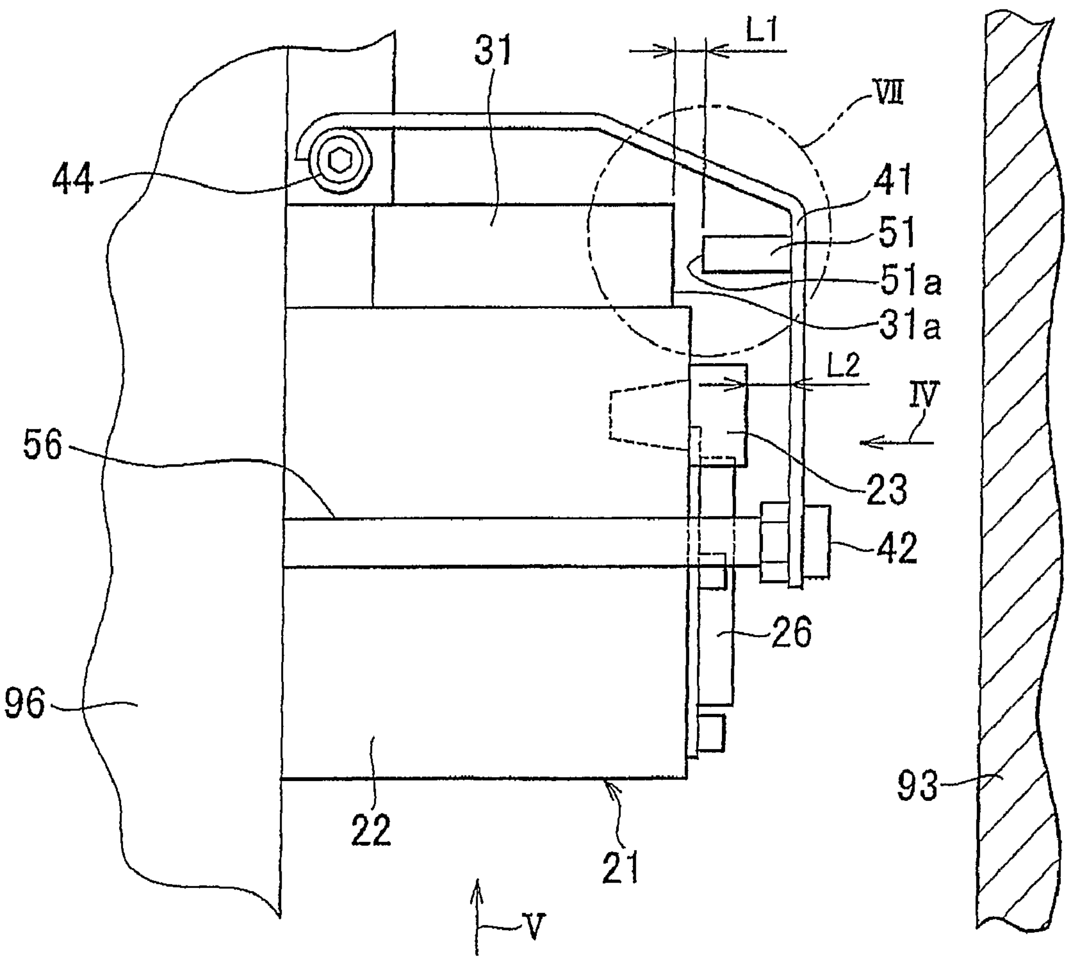
FIG. 3 is an enlarged plan view showing the area surrounded by the chain double-dashed line III in FIG. 2.
Figure 4:
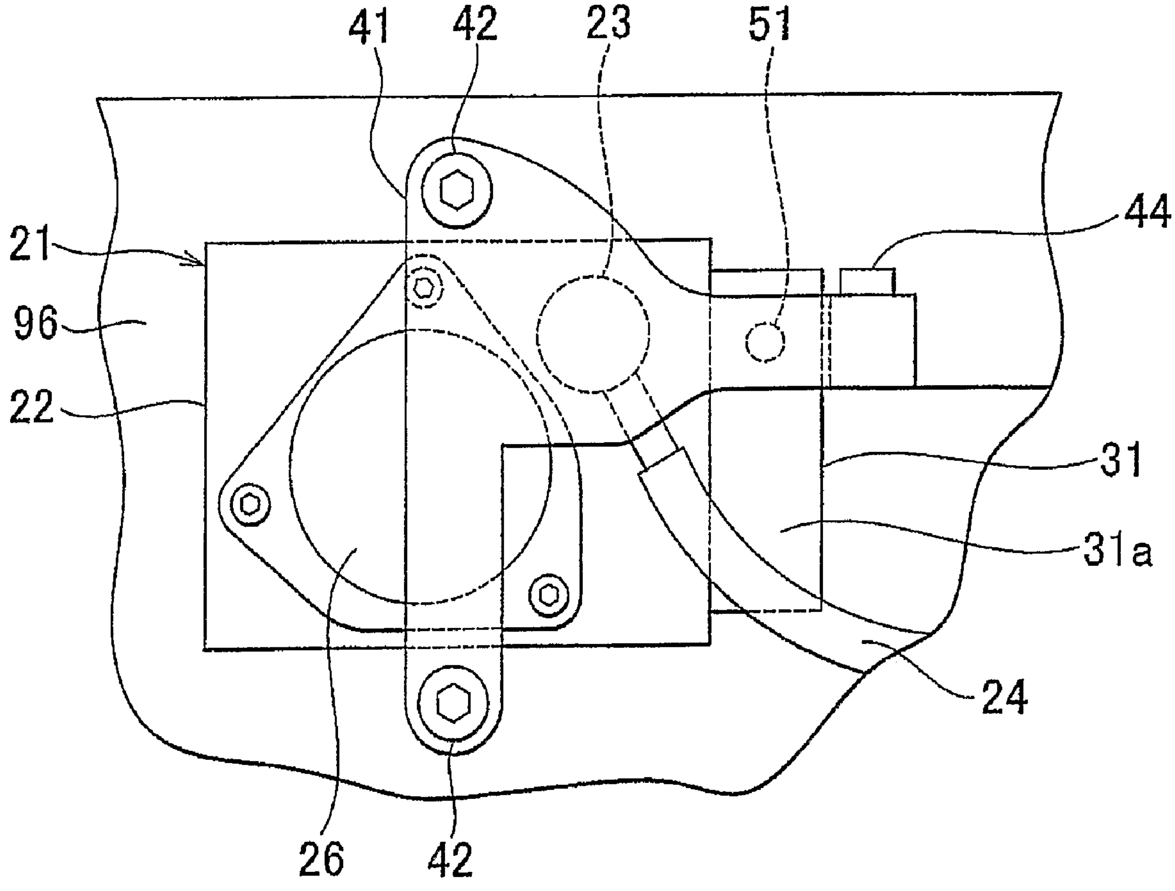
FIG. 4 is a rear view within the engine compartment as seen from the direction shown by the arrow sign IV in FIG. 3.

FIG. 3 is a plan view showing the area surrounded by the chain double-dashed line III in FIG. 2. FIG. 4 is a rear view within the engine compartment as seen from the direction shown by the arrow sign IV in FIG. 3. And FIG. 5 is a side view within the engine compartment as seen from the direction shown by the arrow sign V in FIG. 3.

Figure 5:
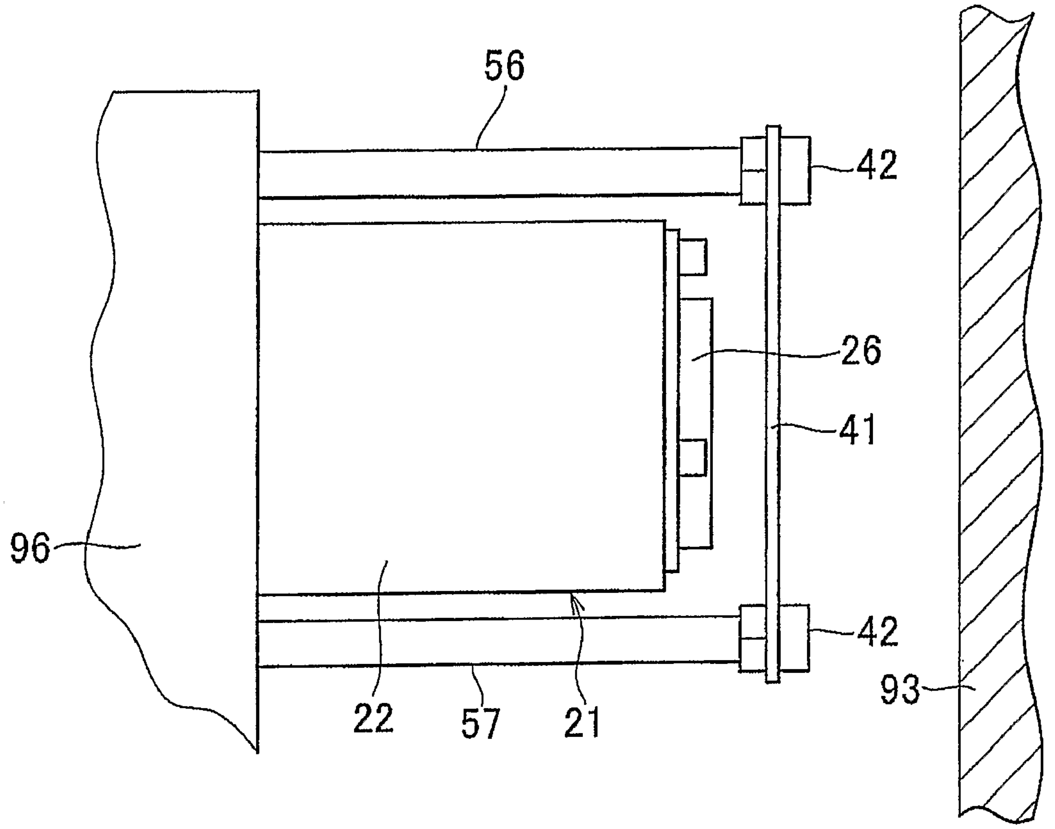
FIG. 5 is a side view within the engine compartment as seen from the direction shown by the arrow sign V in FIG. 3.

Referring to FIG. 3 through FIG. 5, the high-pressure fuel pump 21 defines the pressurization chamber 110 shown in FIG. 1, and includes a main body portion 22 which constitutes the main portion of this high-pressure fuel pump 21, and a block 31 and a union 23 which are fixed to this main body portion 22.

The main body portion 22 is fixed to the cylinder head 96. From the point of view of making it lighter, this main body portion 22 is made of aluminum. A piping coupling not shown in the figures is connected to the block 31. The block 31 is made of cast iron. A hose 24 which constitutes the low-pressure fuel passage 136 in FIG. 1 is connected to the union 23. The union 23 is made of steel. In this embodiment, the block 31 is made of a material which has higher rigidity than the material from which the union 23 is made. And the union 23 functions as a coupling member which connects the low-pressure fuel passage 136 in FIG. 1 to the main body portion 22.

It should be understood that the union 23 is not limited by this structure; it would also be acceptable for it to be endowed with a function of acting as a coupling member to connect the high-pressure fuel passage 141 in FIG. 1 to the main body portion 22. I.e., the union 23 is a coupling member which connects fuel passages to the main body portion 22.

The union 23 is provided in line with the main body portion 22 along the fore and aft direction of the vehicle. And the block 31 is provided so as to be in line with the main body portion 22 in the widthwise direction of the vehicle. In other words, the union 23 and the block 31 are provided so as to be lined up in mutually different directions with respect to the main body portion 22. The union 23 and the block 31 are provided so as to confront the protector 41 at a certain distance away therefrom. The union 23 and the block 31 are provided as mutually adjoining. In this embodiment, when the high-pressure fuel pump 21 is seen in the fore and aft direction of the vehicle, the distance between the union 23 and the block 31 is of a size within ½ of the total length of the high-pressure pump 21 in the widthwise direction of the vehicle.

The union 23 is fixed to the main body portion 22 by being pressed thereinto. The block 31 is fixed to the main body portion 22 by bolts not shown in the figures. With this type of structure, the union 23 is endowed with a relatively small rigidity, while the block 31 is endowed with a relatively high rigidity. In this embodiment, the magnitudes of the rigidities with which the union 23 and the block 31 are endowed are determined by the reliability which is manifested against leaking out of fuel. In more concrete terms, suppose that, in the direction in which the high-pressure fuel pump 21 and the dashboard panel 93 are lined up, in this embodiment in the fore and aft direction of the vehicle, a force in the direction to make the protector 41 approach towards the high-pressure fuel pump 21, i.e. in this embodiment a force from the rear of the vehicle towards the front of the vehicle, acts upon the high-pressure fuel pump 21 as an external force. In this case, leakage out of fuel at the union 23, which is fixed to the main body portion 22 by being pressed in, occurs with a relatively small force as compared to the block 31, while leakage out of fuel at the block 31 which is fixed to the main body portion 22 by bolts occurs with a relatively large force as compared to the union 23

The protector 41 is arranged in line with the high-pressure fuel pump 21 and the dashboard panel 93, so as to be overlapped with the high-pressure fuel pump 21 as seen in the fore and aft direction of the vehicle. The protector 41 may be overlapped with the entirety of the high-pressure fuel pump 21, or may only be overlapped with a portion of the high-pressure fuel pump 21. And the protector 41 is provided so as to overlap, at least, with the union 23 which is endowed with a relatively small rigidity, and with the block 31 which is endowed with a relatively high rigidity.

The protector 41 is kept at a predetermined distance from the high-pressure fuel pump 21, with a predetermined distance between them, by strut bolts 56 and 57, which act as strut members.

Figure 6:
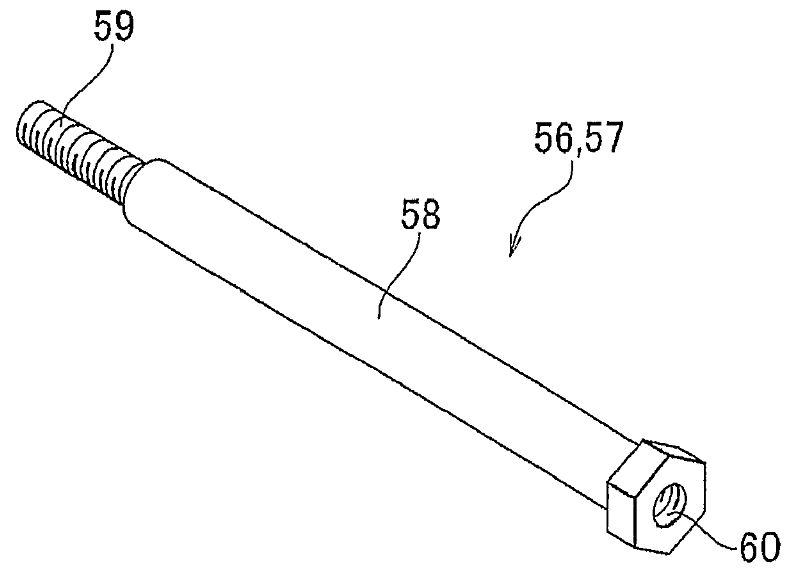
FIG. 6 is a perspective view of strut bolts shown in FIG. 5.

FIG. 6 is a perspective view of the strut bolts 56 and 57 shown in FIG. 5. Referring to FIGS. 5 and 6, each of these strut bolts 56 and 57 includes a shaft portion 58 which extends from the cylinder head 96 towards the protector 41, a screw portion 59 formed on one end of the shaft portion 58 and which is engaged with the cylinder head 96, and a screw portion 60 which is formed on the other end of the shaft portion 58 and which is engaged with the protector 41.

In this embodiment, male screws are formed upon the screw portions 59. By screwing these screw portions 59 into female screws which are formed in the cylinder head 96, the strut bolts 56 and 57 are engaged with the cylinder head 96. Furthermore, female screws are formed upon the screw portions 60. By screwing bolts 42 into these screw portions 60, the protector 41 is engaged with the strut bolts 56 and 57. Furthermore, at a position which is separated in the widthwise direction of the vehicle from the strut bolts 56 and 57 by a certain distance, the protector 41 is engaged by a bolt 44 to the cylinder head 96.

It should be understood that although, in this embodiment, the shaft portion 58 has a cylindrical shape, this is not to be considered as being limitative; it would also be acceptable for it to have a quadratic prism shape or an elliptic cylindrical shape or the like. It would also be acceptable for a female screw to be formed upon the screw portion 59 and a male screw to be formed upon the screw portion 60; or alternatively female screws, or male screws, may be formed upon both the screw portions 59 and 60. As for the positions in which the strut bolts are provided, it would be acceptable to provide them at only one spot, or at three or more spots.

Referring to FIGS. 3 through 5, a pin member 51 is provided to the protector 41 so as to project from the protector 41 towards the block 31 of the high-pressure fuel pump 21. This pin member 51 extends in the fore and aft direction of the vehicle. The pin member 51 is provided at a position which overlaps with the block 31 as seen in the vehicle fore and aft direction. And the pin member 51 is provided so that a gap is present between it and the block 31.

The pin member 51 is made of steel, in a cylindrical shape. However this pin member 51 is not limited to being of a cylindrical shape; it might alternatively, for example, be made in a quadratic prism shape or an elliptic cylinder shape. It is desirable for the pin member 51 to be made of metal. The pin member 51 is fixed to the protector 41 by welding. Moreover, it would also be acceptable for the pin member 51 to be formed as one unit with the protector 41, during the manufacture of the protector 41 by a casting manufacturing process or a pressing process or the like.

As the distance L1 between the pin member 51 and the block 31 in the fore and aft direction of the vehicle, if the minimum gap between the protector 41 and the union 23 is termed L2, the pin member 51 is provided so that the relationship L1<L2 is satisfied.

During a vehicle collision, if the engine compartment 91 is deformed and the engine 95 shifts towards the rear of the vehicle, both the high-pressure fuel pump 21 and the protector 41 shift towards the dashboard panel 93 together. Suppose that, at this time, according to the magnitude of the shock which is created during the collision, the protector 41 shifts far enough to contact against the dashboard panel 93, and furthermore suppose that the high-pressure fuel pump 21 and the protector 41 are approach one another in the fore and aft direction of the vehicle.

Even in this type of case, in this embodiment, before the protector 41 and the union 23 come into contact with one another, the pin member 51 comes into contact with the block 31. Due to this, the energy by which the high-pressure fuel pump 21 and the protector 41 approach towards one another is absorbed by the block 31, which is endowed with a relatively high rigidity as compared to the union 23. Furthermore, in this embodiment, since the strut bolts 56 and 57 are provided which extend in the form of axes in the fore and aft direction of the vehicle, accordingly it is possible to weaken the vehemence by which the high-pressure fuel pump 21 and the protector 41 are approaching towards one another, due to these strut bolts 56 and 57. Thus, according to this embodiment, it is possible to suppress contact against the union 23 which is endowed with a relatively small rigidity as compared to the protector 41 and the block 31. Furthermore, even if the protector 41 and the union 23 should come into mutual contact, it is possible to suppress the shock which is imparted to the union 23 to a low value. It should be understood that the position at which the pin member 51 comes into contact with the block 31 may be a position which is closer to the union 23 than the neighborhood of the center of the block 31 shown in FIGS. 3 and 4 in the widthwise direction of the vehicle. In this case, it is possible to suppress the shock which is imparted to the union 23 to a lower value.

The pin member 51 has an end surface 51*a* which constitutes its end surface facing towards the block 31. And the block 31 has a side surface 31*a* which confronts the pin member 51. The end surface 51*a* and the side surface 31*a* have shapes such that, when the protector 41 and the high-pressure fuel pump 21 approach one another in the fore and aft direction of the vehicle and these surfaces come into contact with one another, they mutually engage together. Desirably, the end surface 51*a* and the side surface 31*a* extend in the direction orthogonal to the fore and aft direction of the vehicle, in other words they extend mutually parallel in the widthwise direction of the vehicle.

According to this type of structure it is possible to ensure that, when the pin member 51 contacts against the block 31, the contact area between the end surface 51*a* and the side surface 31*a* is large. Due to this, it is possible for the shock created during their contact to be reliably received and stopped by the block 31.

Figure 7B:
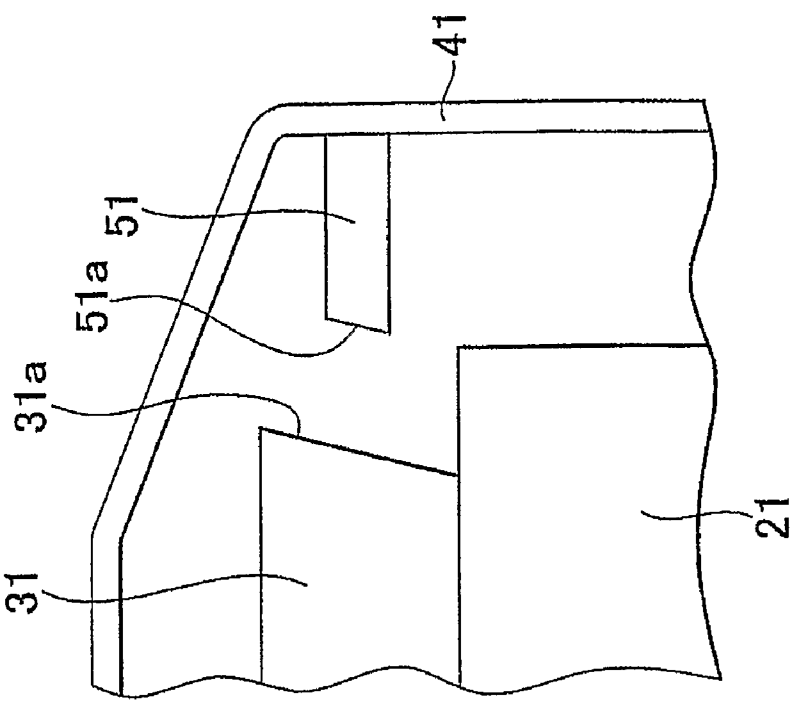
FIGS. 7A and 7B are enlarged plan views showing variant embodiments of a pin member and a block in the area shown by the chain double-dashed line VII in FIG. 3.
Figure 7A:
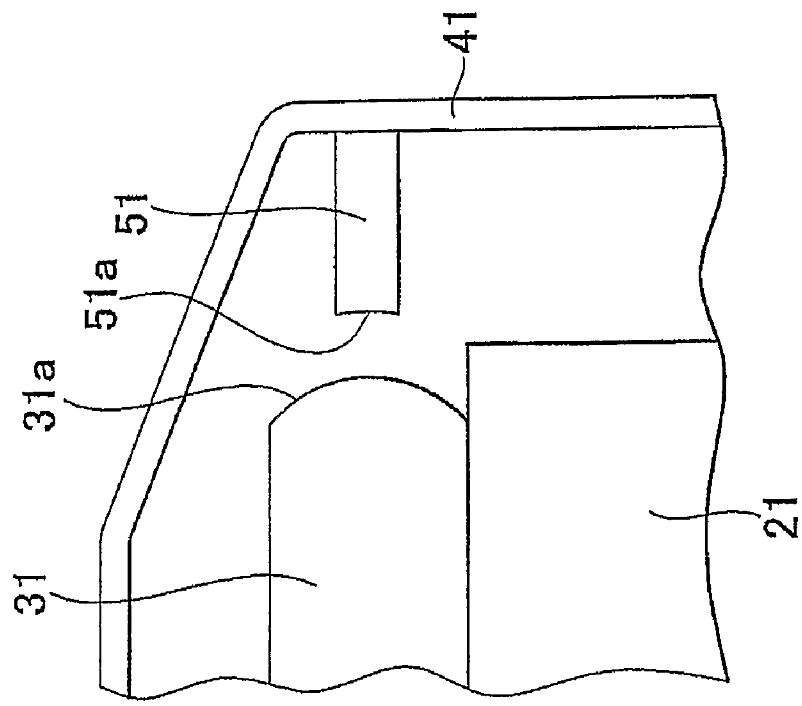

FIGS. 7A and 7B are enlarged plan views showing variant embodiments of the pin member and the block. In this figure, the area surrounded by the chain double-dashed line VII in FIG. 3 is shown. Referring to FIG. 7A, in this variant embodiment, the end surface 51*a* and the side surface 31*a* are formed as curving surfaces which mutually engage together. Referring to FIG. 7B, in this variant embodiment, the end surface 51*a* and the side surface 31*a* are formed as sloping surfaces which mutually engage together. The same beneficial effects as described above may be obtained with these variant embodiments as well.

The fuel supply system component protective construction according to the first embodiment of this invention includes the high-pressure fuel pump 21, which constitutes a fuel supply system component, the protector 41, which constitutes a protective member, and the pin member 51, which constitutes a shock absorption member. The high-pressure fuel pump 21 is disposed between the engine 95, which constitutes a vehicle structural component which is mounted upon the vehicle, and the dashboard panel 93, which constitutes a vehicle main body component which makes up the vehicle body of the vehicle. The high-pressure fuel pump 21 includes the block 31, which constitutes a high rigidity portion, and the union 23, which constitutes a low rigidity portion which is endowed with a rigidity which is relatively small as compared to the block 31. The high-pressure fuel pump 21 is supported by the engine 95. The protector 41 is disposed between the high-pressure fuel pump 21 and the dashboard panel 93, and confronts the union 23 and the block 31 with a certain distance between them. The pin member 51 is provided between the block 31 and the protector 41. If the high-pressure fuel pump 21 and the protector 41 shift in the direction to mutually approach towards one another, the pin member 51 contacts against the block 31 before the protector 41 contacts against the union 23, so that a resilient force operates upon the high-pressure fuel pump 21 and the protector 41.

According to the fuel supply system component protective construction of this first embodiment of the invention, it is possible to suppress any shock which acts upon the union 23 during a vehicle collision to a low level, and it is accordingly possible to appropriate protection of the high-pressure fuel pump 21. In order to mitigate the shock upon the union 23, it had been necessary to change the shape of the dashboard panel 93, or to change the position of the union 23, so that the protector 41 and the union 23 did not come into mutual contact during a vehicle collision. Furthermore, means were also utilized for enhancing the rigidity of the protector 41, so that the protector 41 should not approach the high-pressure fuel pump 21. By contrast, in this embodiment, the shock which acts upon the union 23 is mollified by the pin member 51. Due to this, there is no invitation to any great change of the design or any very great increase of mass, and moreover it is possible to prevent damage to the high-pressure fuel pump 21.

It should be understood that although, in this embodiment, the case in which the fuel supply system component is the high-pressure fuel pump 21 has been explained, the invention is not limited to this case; it would also be acceptable for the fuel supply system component to be constituted, for example, by the high-pressure fuel passage 141 and/or the low-pressure fuel passage 136 in FIG. 1, or by various types of component which make up the fuel supply system. Furthermore, it would also be acceptable for the fuel supply system component to be a sedimentor which separates out moisture in the fuel.

Furthermore although, in FIG. 2, a longitudinally arranged in line type engine was shown as the vehicle structural component which supports the high-pressure fuel pump 21, this is not to be considered as being limitative; it would also be acceptable for the engine to be one of a transversely disposed type, or to be a V type engine or a W type engine, or to be a horizontally-opposed type engine or the like. Furthermore, the vehicle structural component might also be some other component mounted to the vehicle, other than the engine. Moreover, the vehicle main body component is not limited to being the dashboard panel 93; for example, it would also be acceptable for it to be the front bumper 94 shown in FIG. 2, or to be the vehicle side body.

II. Embodiment 2

Figure 8:
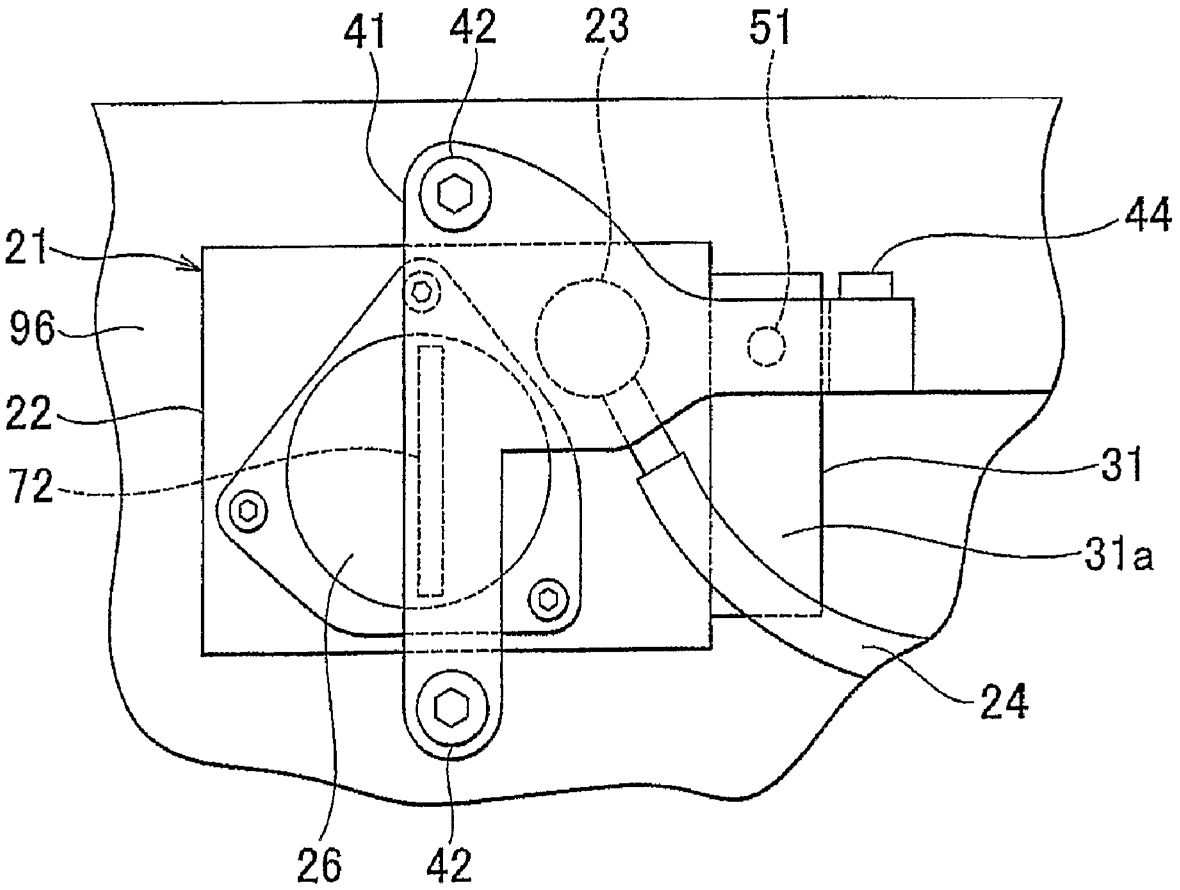
FIG. 8 is a rear view showing the interior of the engine compartment of a vehicle to which a fuel supply system component protective construction according to a second embodiment of the invention is applied, as seen from the direction shown by the arrow sign IV in FIG. 3.
Figure 9:
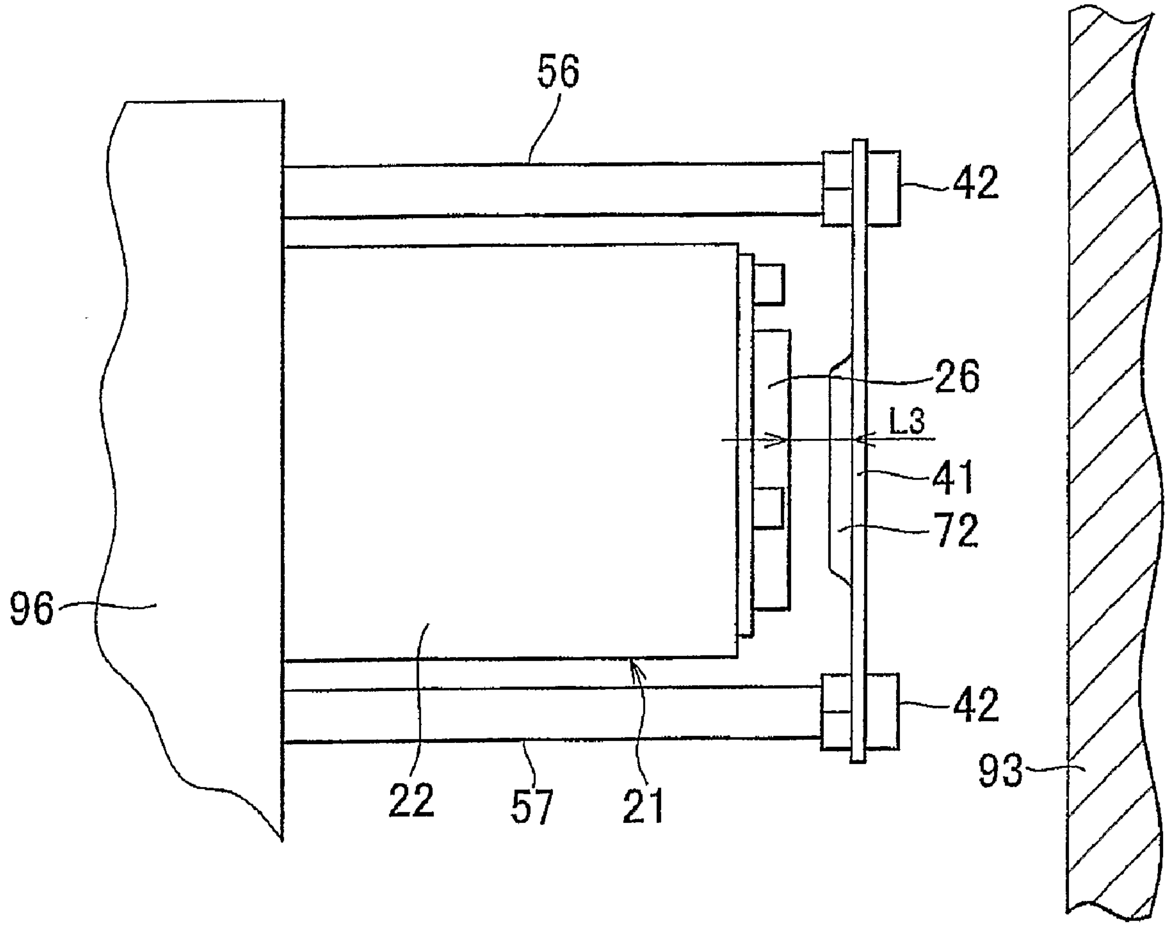
FIG. 9 is a side view within the engine compartment in FIG. 8 as seen from the direction shown by the arrow sign V in FIG. 3.

FIG. 8 is a rear view showing the interior of the engine compartment of a vehicle to which a fuel supply system component protective construction according to a second embodiment of the invention is applied. And FIG. 9 is a side view within the engine compartment in FIG. 8. FIG. 8 is a figure corresponding to FIG. 4 for the first embodiment, and FIG. 9 is a figure corresponding to FIG. 5 for the first embodiment. To compare the fuel supply system component protective construction according to this embodiment with the fuel supply system component protective construction according to the first embodiment, they have fundamentally the same construction. In the following, repeated explanation will not be given of overlapped features of the construction.

Referring to FIGS. 8 and 9, the high-pressure fuel pump 21 further includes a cover member 26 which is fixed to the main body portion 22. This cover member 26 closes an opening portion which is formed in the main body portion 22, so that fuel which is pressurized in the main body portion 22 and is delivered therefrom does not leak out. This cover member 26 is made of steel. The cover member 26 and the union 23 are made of the same material. The cover member 26 and the block 31 are located upon opposite sides of the union 23.

The cover member 26 is fixed to the main body portion 22 by a plurality of bolts. According to this type of structure, the union 23 is endowed with a relatively small rigidity as compared with the block 31, while the block 31 is endowed with a relatively high rigidity as compared with the union 23. The protector 41 is provided so as further to overlap the cover member 26, as seen in the fore and aft direction of the vehicle.

In this embodiment, in addition to the pin member 51, there is further provided to the protector 41 a rib member 72 which acts as a second shock absorption member. This rib member 72 is provided at a position of the protector 41 to confront the cover member 26. The rib member 72 projects upward from the surface of the protector 41, and extends in the shape of a band. This rib member 72 is provided in such a position as to overlap the cover member 26 as seen in the fore and aft direction of the vehicle. And the rib member 72 is provided so that a gap is present between it and the cover member 26.

If the distance between the rib member 72 and the cover member 26 in the fore and aft direction of the vehicle is taken as being L3, and the minimum gap between the protector 41 and the union 23 is taken as being L2, then the rib member 72 is provided so that the relationship L3<L2 is satisfied. L3 may be equal to the distance L1 between the pin member 51 and the block 31 and a large and small relationship may exist between L3 and L1.

In this embodiment, the fuel supply system component protective construction includes the pin member 51 and the rib member 72, corresponding to a plurality of shock absorption members.

A collision test using the protector 41 and the high-pressure fuel pump 21 shown in FIGS. 8 and 9, and a collision test for comparison using a protector and a high-pressure fuel pump 21 to which no pin member 51 or rib member 72 were provided, were implemented, and the collision loads at which damage to the union 23 were observed was measured. The result was that it was confirmed that the collision load which was measured in the collision test with this embodiment had a value almost 1.5 times that of the collision load which was measured in the collision test for comparison.

According to the fuel supply system component protective construction according to the second embodiment of the invention having the structure described above, it is possible to obtain the same beneficial effects as the beneficial effects described in relation to the first embodiment.

It should be understood that although, in this embodiment, the case has been explained in which both the rib member 72 and the pin member 51 are provided to the protector 41, it would also be acceptable to provide shock absorption members at three or more spots.

III. Embodiment 3

Figure 10:
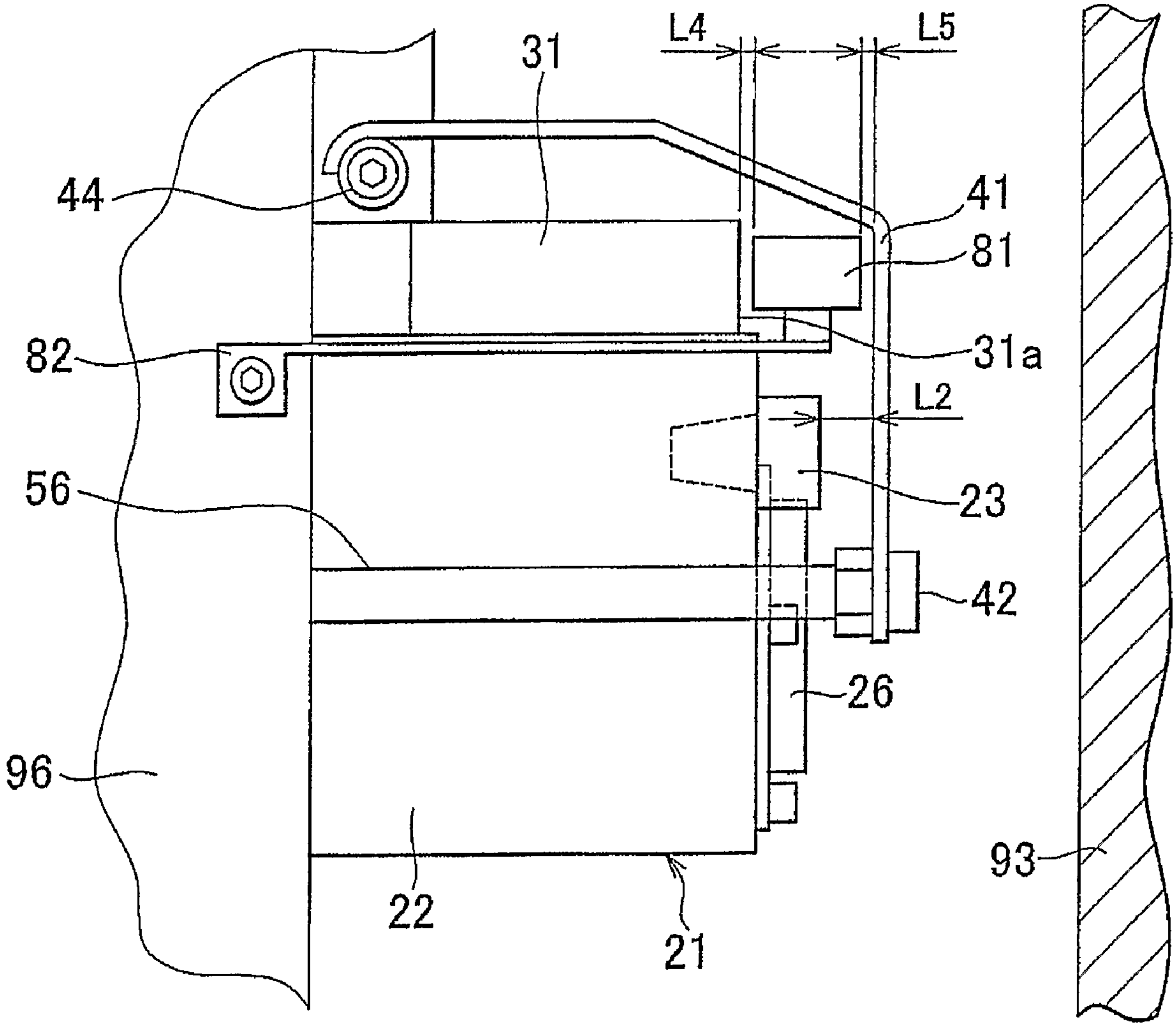
FIG. 10 is a plan view showing the interior of the engine compartment of a vehicle to which a fuel supply system component protective construction according to a third embodiment of the invention is applied.

FIG. 10 is a plan view showing the interior of the engine compartment of a vehicle to which the fuel supply system component protective construction according to a third embodiment of the invention is applied. FIG. 10 is a figure corresponding to FIG. 3 for the first embodiment. To compare the fuel supply system component protective construction according to this embodiment with the fuel supply system component protective construction according to the first embodiment, they have fundamentally the same construction. In the following, repeated explanation will not be given of overlapped features of the construction.

Referring to FIG. 10, in this embodiment, instead of the pin member 51 of FIG. 3, a pin member 81 is disposed between the protector 41 and the block 31 as a shock absorption member. This pin member 81 is arranged at a position which is separated from both the protector 41 and the block 31 by a certain distance. The pin member 81 is supported between the protector 41 and the block 31 by a plate 82 which is a support member fixed to the cylinder head 96. Thus, in this embodiment, the pin member 81 is not provided to the protector 41.

If the distance between the block 31 and the pin member 81 is taken as being L4, and the distance between the pin member 81 and the protector 41 is taken as being L5, then the pin member 81 is provided so that the relationship L4+L5<L2 is satisfied.

According to the fuel supply system component protective construction according to the third embodiment of the invention having the structure described above, it is possible to obtain the same beneficial effects as the beneficial effects described in relation to the first embodiment.

It should be understood that it would also be acceptable further to provide the rib member 72 of the second embodiment shown in FIGS. 8 and 9 to the protector 41 shown in FIG. 10.

In the embodiments disclosed above, all of the various features should be considered as given by way of example, and not as being limitative. The range of the invention is not limited by the above explanation, and is specified only by the range of the Patent Claims; all changes which have the same meaning as the range of the Patent Claims and which are within their scope are intended to be included.

The invention claimed is:

1. A fuel supply system component protective construction, comprising:

a fuel supply system component which is disposed between a vehicle structural component mounted upon a vehicle, and a vehicle main body component which makes up a vehicle body of the vehicle, which comprises a high rigidity portion and a low rigidity portion endowed with relatively low rigidity as compared with the high rigidity portion, and which is supported upon the vehicle structural component;

a protective member which is disposed between the fuel supply system component and the vehicle main body component, and which confronts the high rigidity portion and the low rigidity portion at a certain distance; and a shock absorption member which is provided between the high rigidity portion and the protective member, wherein when the fuel supply system component and the protective member shift in the direction to mutually approach one another, the shock absorption member contacts the high rigidity portion before the protective member contacts the low rigidity portion, so that a resilient force is caused to operate upon the fuel supply system component and the protective member.

2. A fuel supply system component protective construction according to claim 1, wherein the high rigidity portion is made of cast iron.

3. A fuel supply system component protective construction according to claim 1, wherein the low rigidity portion is made of steel.

4. A fuel supply system component protective construction according to claim 1, wherein the shock absorption member is provided to the protective member, and projects towards the high rigidity portion.

5. A fuel supply system component protective construction according to claim 4, wherein the protective member is supported by the vehicle structural component;

wherein the shock absorption member is provided with a predetermined interval being left between it and the high rigidity portion; and wherein the predetermined interval is smaller than the minimum gap between the low rigidity portion and the protective member.

6. A fuel supply system component protective construction according to claim 5, wherein the shock absorption member has an end surface which faces the high rigidity portion, and the end surface has a shape which engages with the confronting high rigidity portion.

7. A fuel supply system component protective construction according to claim 4, wherein the shock absorption member has an end surface which faces the high rigidity portion, and the end surface has a shape which engages with the confronting high rigidity portion.

8. A fuel supply system component protective construction according to claim 1, wherein the shock absorption member is supported by a support member which is fixed to the vehicle structural component.

9. A fuel supply system component protective construction according to claim 1, further comprising:

a second shock absorption member which is provided between the fuel supply system component and the protective member.

10. A fuel supply system component protective construction according to claim 9, wherein the second shock absorption member is provided to the protective member, and the gap between the second shock absorption member and the fuel supply system component is smaller than the minimum gap between the low rigidity portion and the protective member.

11. A fuel supply system component protective construction according to claim 1, wherein the protective member is supported by the vehicle structural component.

12. A fuel supply system component protective construction according to claim 11, further comprising:

a strut member which extends from the vehicle structural component towards the protective member, and which maintains the protective member in a position which is separated by a certain distance from the high rigidity portion and the low rigidity portion, wherein screw portions are provided to the strut member for engaging to the vehicle structural component and to the protective member.

13. A fuel supply system component protective construction according to claim 1, wherein the fuel supply system component is contained in an engine compartment which is provided at the front of the vehicle.

14. A fuel supply system component protective construction according to claim 1, wherein the low rigidity portion is a union.

15. A fuel supply system component protective construction according to claim 14, wherein the high rigidity portion is a block.

16. A vehicle, comprising a fuel supply system component protective construction according claim 1.

* * * * *